(12) United States Patent
Ju

(10) Patent No.: US 12,403,534 B2
(45) Date of Patent: Sep. 2, 2025

(54) LONG BORING BAR DEVICE OF MACHINE TOOL

(71) Applicant: DN SOLUTIONS CO., LTD., Changwon-si (KR)

(72) Inventor: Taehwan Ju, Gimhae-si (KR)

(73) Assignee: DN SOLUTIONS CO., LTD., Changwon-si (KR)

( * ) Notice: Subject to any disclaimer, the term of this patent is extended or adjusted under 35 U.S.C. 154(b) by 300 days.

(21) Appl. No.: 17/798,512

(22) PCT Filed: Feb. 9, 2021

(86) PCT No.: PCT/KR2021/001758
§ 371 (c)(1),
(2) Date: Aug. 9, 2022

(87) PCT Pub. No.: WO2021/167287
PCT Pub. Date: Aug. 26, 2021

(65) Prior Publication Data
US 2023/0072409 A1    Mar. 9, 2023

(30) Foreign Application Priority Data

Feb. 20, 2020 (KR) .................. 10-2020-0021299

(51) Int. Cl.
*B23B 29/02*  (2006.01)
*B23B 29/04*  (2006.01)
(Continued)

(52) U.S. Cl.
CPC .......... *B23B 29/025* (2013.01); *B23B 29/046* (2013.01); *B23B 29/242* (2013.01);
(Continued)

(58) Field of Classification Search
CPC ... B23B 29/025; B23B 29/242; B23B 29/246; B23B 29/02; B23B 29/34; B23B 29/03;
(Continued)

(56) References Cited

U.S. PATENT DOCUMENTS 3,064,503 A * 11/1962 Fry .................. B23B 29/022
                                                        408/232
4,406,195 A *  9/1983 Kruger ............ B23B 31/10741
                                                        82/158
(Continued)

FOREIGN PATENT DOCUMENTS

CN      105364598 A  *  3/2016  .......... B23B 29/046
DE        3709299 A1 *  9/1988
(Continued)

OTHER PUBLICATIONS

International search report of PCT/KR2021/001758, May 7, 2021, English translation.

*Primary Examiner* — Ryan Rufo
(74) *Attorney, Agent, or Firm* — STIP Law Group, LLC

(57) ABSTRACT

The present disclosure relates to a long boring bar device of a machine tool and, more particularly, to a long boring bar device of a machine tool, wherein a boring bar is detachably fastened to a holder, and a head tool is detachably fastened to the boring bar to automatically exchange a head tool through an automatic tool changer, thereby reducing non-processing time and improving productivity of the machine tool.

8 Claims, 10 Drawing Sheets

(51) Int. Cl.
    *B23B 29/24*      (2006.01)
    *B23B 31/103*     (2006.01)
    *B23B 31/30*      (2006.01)

(52) U.S. Cl.
    CPC ............. *B23B 31/103* (2013.01); *B23B 31/30*
                (2013.01); *B23B 2231/26* (2013.01)

(58) Field of Classification Search
    CPC ..... B23B 29/046; B23B 29/20; B23B 31/302;
                                           B23B 31/265
    See application file for complete search history.

(56)          References Cited

U.S. PATENT DOCUMENTS

| | | | | |
|---|---|---|---|---|
| 4,601,094 | A * | 7/1986 | Myers | B23B 3/16 |
| | | | | 483/24 |
| 4,604,009 | A * | 8/1986 | Tennerstedt | B23B 29/046 |
| | | | | 279/57 |
| 4,608,747 | A * | 9/1986 | Link | B23Q 7/046 |
| | | | | 409/218 |
| 4,632,614 | A * | 12/1986 | Rall | B23B 29/244 |
| | | | | 279/58 |
| 4,758,121 | A * | 7/1988 | Kwech | B23Q 9/0021 |
| | | | | 408/81 |
| 4,856,153 | A * | 8/1989 | Gusching | B23B 31/261 |
| | | | | 29/27 A |
| 5,065,492 | A * | 11/1991 | Von Haas | B23B 29/046 |
| | | | | 29/426.6 |
| 5,346,344 | A * | 9/1994 | Kress | B23B 29/046 |
| | | | | 408/239 R |
| 5,431,513 | A * | 7/1995 | Agapiou | B23B 29/02 |
| | | | | 408/188 |
| 9,505,059 | B2 * | 11/2016 | Chen | B23B 29/046 |
| 9,669,470 | B2 * | 6/2017 | Matlik | B23B 31/265 |
| 9,839,963 | B2 * | 12/2017 | Englund | B23B 29/046 |
| 9,839,965 | B2 * | 12/2017 | Englund | B23B 29/046 |
| 11,033,995 | B2 * | 6/2021 | Izumi | B23Q 11/122 |
| 2009/0087268 | A1 * | 4/2009 | Schafer | B23B 29/046 |
| | | | | 407/101 |
| 2010/0247256 | A1 | 9/2010 | Katzenberger et al. | |
| 2016/0052063 | A1 * | 2/2016 | Englund | B23B 31/4033 |
| | | | | 279/2.1 |
| 2016/0052065 | A1 * | 2/2016 | Englund | B23B 31/4006 |
| | | | | 279/2.02 |

FOREIGN PATENT DOCUMENTS

| | | | | | |
|---|---|---|---|---|---|
| DE | 4117765 | A1 | * | 12/1992 | |
| DE | 4303608 | A1 | * | 8/1994 | ........... B23B 29/046 |
| DE | 102012108143 | A1 | * | 5/2014 | ........... B23B 29/046 |
| DE | 102013104874 | B3 | * | 12/2014 | ............. B23B 29/20 |
| EP | 0121665 | A2 | * | 10/1984 | |
| GB | 2175227 | A | * | 11/1986 | ........... B23B 29/046 |
| JP | 61146443 | A | * | 7/1986 | |
| JP | 2008110456 | A | * | 5/2008 | ........... B23B 29/046 |
| KR | 200373336 | Y1 | * | 1/2005 | |
| KR | 20110049998 | A | * | 5/2011 | |
| KR | 20110071888 | A | * | 6/2011 | |
| KR | 20130063189 | A | | 6/2013 | |
| KR | 20150064777 | A | * | 6/2015 | |
| KR | 20150072867 | A | * | 6/2015 | |
| KR | 20160128102 | A | * | 11/2016 | |
| KR | 20180046585 | A | | 5/2018 | |
| KR | 20180077630 | A | | 7/2018 | |
| KR | 20190047791 | A | | 5/2019 | |

* cited by examiner

--Prior Art--

--Prior Art--

*120:121,122,123,124,125,126

*220:221,222,223,224,225

LONG BORING BAR DEVICE OF MACHINE TOOL

CROSS-REFERENCE TO RELATED APPLICATIONS

This application is the U.S. National Phase under 35 U.S.C. § 371 of International Application No. PCT/KR2021/001758 filed on Feb. 9, 2021, which in turn claims the benefit of Korean Application No. 10-2020-0021299 filed on Feb. 20, 2020, the disclosures of which are incorporated by reference into the present application.

FIELD OF THE DISCLOSURE

The present disclosure relates to a long boring bar device of a machine tool and, more particularly, to a long boring bar device of a machine tool, wherein a boring bar is detachably fastened to a holder, and a head tool is detachably fastened to the boring bar to automatically exchange a head tool through an automatic tool changer, thereby reducing non-processing time and improving productivity of the machine tool.

BACKGROUND OF THE DISCLOSURE

In general, a machine tool refers to a machine tool which is used to process a metal/non-metal workpiece in a desired shape and dimension by using a suitable tool by various cutting or non-cutting methods.

Various types of machine tools, such as a turning center, vertical/horizontal machining centers, a gantry type machining center, a Swiss turn, a discharge machining machine, a horizontal NC boring machine, a CNC lathe, a composite machining machine, and the like, are widely used in various industrial sites in accordance with the purpose of the corresponding work.

Among machine tools, a multi-tasking machine means a turning center equipped with a multi-function automatic tool changer (ATC) and tool magazine that performs various machining types such as turning, drilling, tapping, and milling. In the complex machining device, a tool is manually mounted on a tool magazine when a worker loads or exchanges the tool required for machining.

In general, various types of machine tools currently used include an operating panel to which a numerical control (NC) or computerized numerical control (CNC) technique is applied. The operating panel is provided with various function switches or buttons and a monitor.

In addition, the machine tool includes a table on which a workpiece is seated and which is transferred to process the workpiece, a palette which prepares the workpiece before processing, a main shaft which is rotated by coupling a tool or the workpiece, a tailstock which supports the workpiece and the like during processing, a vibration isolator, and the like.

In general, in a machine tool, a table, a tool post, a main shaft, a tailstock, a vibration isolator, and the like are provided with a transfer unit which transfers along a feeding shaft to perform various processes.

In addition, in general, a machine tool uses a plurality of tools for various processes, and a tool magazine or turret is used in the form of a tool storage space storing the plurality of tools.

Such a machine tool uses a plurality of tools for various processes, and a tool magazine is used in the form of a tool storage place storing the plurality of tools.

In addition, in general, a machine tool includes an automatic tool changer (ATC) for withdrawing or reloading a specific tool from a tool magazine by a command of a numerical control unit in order to improve productivity of the machine tool.

In addition, in general, a machine tool includes an automatic palette changer (APC) to minimize a non-processing time. The automatic palette changer (APC) automatically exchanges a palette between a workpiece processing area and a workpiece installation area. The workpiece may be mounted on the palette.

In general, machine tools are classified into a turning center and a machining center according to processing methods. The dual turning center includes a plurality of tools and a turret tool unit which indexes the tools required in the process.

As shown in FIGS. 1 and 2, a machine tool, particularly, a turning center, receives a plurality of tools in a turret 2 in order to smoothly process a workpiece and increase productivity.

The turret 2 is rotated by a driving device. That is, the turret is rotated by the driving device so that a necessary tool can be selected according to processing of the workpiece 7 of the machine tool.

As shown in FIG. 1, in a machine tool such as a turning center, a workpiece is rotated by a driving device such as a servo motor in a state in which the workpiece 7 is clamped to a chuck 6. In this case, boring bars 3 are used for the machining of the inner or outer diameter of the workpiece.

In a conventional machine tool such as a turning center, a boring bar cannot be directly fastened to a turret, so the holder 4 is mounted on the turret by a plurality of bolts, and then the boring bar 3 is mounted on the holder 4 to process an inner diameter or an outer diameter of the workpiece 7.

In addition, as shown in FIG. 2, in the conventional machine tool such as a turning center, an outer diameter tool holder 9 is mounted on the turret 2, and the outer diameter of the workpiece is processed by the outer diameter tool 8.

As shown in FIG. 1, the conventional long boring bar device of a machine tool is mounted with a plurality of bolts when the holder is mounted on or detached from the turret, and thus, it takes a long time to reduce productivity.

In addition, in the conventional long boring bar device for machine tools, since a separate pipe or the like is required to be installed in order to supply cutting oil to the tool tip formed at the front end of the boring bar, the device cannot be miniaturized, such that space utilization is reduced, equipment becomes complicated, and manufacturing costs are increased.

Further, as shown in FIG. 2, in the conventional long boring bar device of a machine tool, when the long boring bar is not used (when a workpiece is processed using another tool), the long boring bar interferes with and collides with the other device, and thus, equipment is damaged, and thus, a resource is discharged and a safety accident occurs. In order to prevent this, when the long boring bar is not used, a plurality of bolts should be loosened even when the long boring bar is detached from the turret, which takes a lot of time, causing inconvenience to workers.

In addition, in a conventional long boring bar device of a machine tool, even though the tool tip of the long boring bar needs to be replaced according to frequent processes, the tool tip alone cannot be automatically replaced, and thus, as a time for replacing the tool tip is consumed, work efficiency is reduced according to an increase in non-processing time, processing costs are increased, and machining precision is reduced.

Therefore, it is urgent to develop a long boring bar device with a machine tool that enables a holder to be easily attached to or detached from a turret, a long boring bar to be easily attached to or detached from the holder automatically or manually, and a tool tip to be automatically attached to or detached from a long boring bar and replaced when tool tip replacement is required.

DISCLOSURE

Summary

The present disclosure is to solve the above problem, and an object of the present disclosure relates to a long boring bar device of a machine tool in which the boring bar is detachably fastened to a holder by a first clamping unit and a head tool is automatically detachably fastened to the boring bar by a second clamping unit, thereby automatically exchanging a head tool through an automatic tool changer when the head tool needs to be replaced, thereby maximizing productivity of a machine tool, the long boring bar device is simply separated from a turret when the long boring bar is not used, thereby preventing a collision due to interference between equipment which may occur during a process to improve safety and reliability of the machine tool, oil pressure, pneumatic pressure, and cutting oil are supplied through a flow path formed inside the boring bar to miniaturize the device, and productivity of the machine tool can be improved to increase worker convenience.

In order to achieve the purpose of the present disclosure, a long boring bar device of a machine tool according to the present disclosure comprises a turret in which a plurality of tools are accommodated and a boring bar unit mounted on the turret, wherein the boring bar unit comprises a holder which is detachably fastened to the turret; a boring bar which is clamped or unclamped to the holder; and a head tool which is clamped or unclamped to the boring bar.

According to another exemplary embodiment of the present disclosure, the holder of the long boring bar device of the machine tool may comprise a housing unit having a first receiving groove on one side thereof; a first clamping unit formed inside the housing unit to be adjacent to the first receiving groove to clamp or unclamp the boring bar; an inlet unit formed on the other side of the housing unit to supply hydraulic pressure and pneumatic pressure to the inside of the housing unit; and an outlet unit formed on one side of the housing unit to be communicated with the inlet unit to discharge the hydraulic pressure and the pneumatic pressure introduced into the housing unit to the outside of the housing unit.

According to another exemplary embodiment of the present disclosure, the boring bar of the long boring bar device of a machine tool may comprise: a main body having a second receiving groove on one side thereof; a second clamping unit formed inside the main body to be adjacent to the second receiving groove to clamp or unclamp the head tool; a connection unit formed on the other side of the main body to be connected to the outlet when the boring bar is clamped to the holder and to supply hydraulic pressure and pneumatic pressure discharged from the outlet to the inside of the main body; and a shank unit formed on the other side of the main body and coupled to the first clamping unit when the boring bar is clamped to the holder.

Further, in another exemplary embodiment of the long boring bar device of a machine tool according to the present disclosure, the head tool of the long boring bar device of a machine tool may comprise a processing unit processing an inner diameter or an outer diameter of a workpiece; and a coupling unit formed on the other side of the processing unit and coupled to the second clamping unit when the head tool is clamped to the boring bar.

Further, in another exemplary embodiment of the long boring bar device of a machine tool according to the present disclosure, the first clamping unit of the holder of the long boring bar device of the machine tool may comprise a rotating unit rotatably inserted into the housing unit, a first cylinder moving forward or backward with respect to the shank unit according to a rotating direction of the rotating unit, and a first locking unit pivotably installed along a first inclined surface formed at one side of the first cylinder.

Also, in another exemplary embodiment of the long boring bar device of a machine tool according to the present disclosure, the shank unit of the boring bar of the long boring bar device of a machine tool may comprise a first seating groove recessed into the inner circumferential surface of the other side of the shank unit, and the boring bar and the holder may be clamped by rotating the rotating unit so that a first hook unit formed at the front end of one side of the first locking unit rotates along the first inclined surface and is engaged with the first seating groove as the first cylinder moves forward with respect to the shank unit.

In addition, in another exemplary embodiment of the long boring bar device of a machine tool according to the present disclosure, the body unit of the boring bar of the long boring bar device of a machine tool may comprise a first flow path unit communicating with the connection unit and penetrating the inside of the body unit; and a second flow path unit communicating with the connection unit and penetrating the inside of the body unit.

In another exemplary embodiment of the present disclosure, the second clamping unit of the boring bar of the long boring bar of the machine tool may include: a second cylinder configured to move forward or backward with respect to the coupling unit by the hydraulic pressure introduced through the first flow path unit or the second flow path unit; and a second locking unit pivotably installed along a second inclined surface formed at one side of the second cylinder.

In addition, in another preferred embodiment of the long boring bar device of a machine tool according to the present disclosure, the coupling unit of the head tool of the long boring bar device of the machine tool may comprise a second seating groove recessed in the inner circumferential surface of the other side of the coupling unit.

In addition, in another exemplary embodiment of the long boring bar device of a machine tool according to the present disclosure, the head tool of the rolling bar unit of the long boring bar device of a machine tool and the boring bar may be clamped by being engaged in the second receiving groove by rotating a second hook unit formed at the front end of one side of the second locking unit along the second slope as the second cylinder moves forward by the hydraulic pressure introduced through the first flow path unit, and the head tool and the boring bar may be unclamped by rotating the second locking unit along the second inclined surface and being released from the second seating groove as the second cylinder is moved backward by hydraulic pressure introduced through the second flow path unit.

In addition, in another exemplary embodiment of the device for a long boring bar of a machine tool according to the present disclosure, the body unit of the boring bar of the device for a long boring bar of a machine tool may comprise a third flow path unit communicating with the connection unit and penetrating the inside of the body unit in order to supply pneumatic pressure for checking whether the head tool and the boring bar are normally clamped.

In addition, in another exemplary embodiment of the long boring bar device of a machine tool according to the present disclosure, the body unit of the boring bar of the long boring bar device of the machine tool may comprise a fourth flow path unit communicating with the connection unit and penetrating the inside of the body unit in order to supply pneumatic pressure for cleaning the second clamping unit and the second receiving groove when the head tool is replaced.

In addition, in another exemplary embodiment of the device for a long boring bar of a machine tool according to the present disclosure, the body unit of the boring bar of the device for a long boring bar of a machine tool may comprise a fifth flow path unit communicating with the connection unit and penetrating the inside of the body unit in order to supply cutting oil, which is supplied to the inside of the housing unit through the inlet unit and discharged to the outside of the housing unit through the outlet unit, to the head tool.

The long boring bar device of a machine tool according to the present disclosure is advantageous in that the boring bar can be mounted on or removed from the holder by means of a simple rotating operation of the rotating unit of the first clamping unit, thus improving the convenience of an operator, and the long boring bar can be prevented from colliding with another device or the long boring bar due to interference therebetween when the long boring bar is not used, thus reducing maintenance time and costs due to equipment damage, preventing a waste of resources, and reducing processing costs.

In addition, according to the long boring bar device of a machine tool of the present disclosure, the head tool is automatically and detachably fastened to the boring bar by the first flow path unit formed inside the boring bar and the second clamping unit operated by the hydraulic pressure supplied through the second flow path unit, so that when the head tool needs to be replaced, the head tool is automatically exchanged through an automatic tool changer or the like, thereby minimizing the non-processing time and maximizing productivity of the machine tool and increasing the machining precision.

Furthermore, the long boring bar device of a machine tool according to the present disclosure is capable of improving the safety and reliability of a machine tool by preventing malfunction as the clamping or unclamping of the head tool and the boring bar is confirmed by the pneumatic pressure supplied through the third flow path unit.

In addition, a long boring bar device of a machine tool according to the present disclosure can reduce manufacturing costs and manufacturing time and maximize space utilization by supplying hydraulic pressure, pneumatic pressure, and cutting oil through a flow path formed inside the boring bar so as to miniaturize the device.

DETAILED DESCRIPTION OF CERTAIN INVENTIVE EMBODIMENT

Figure 1:
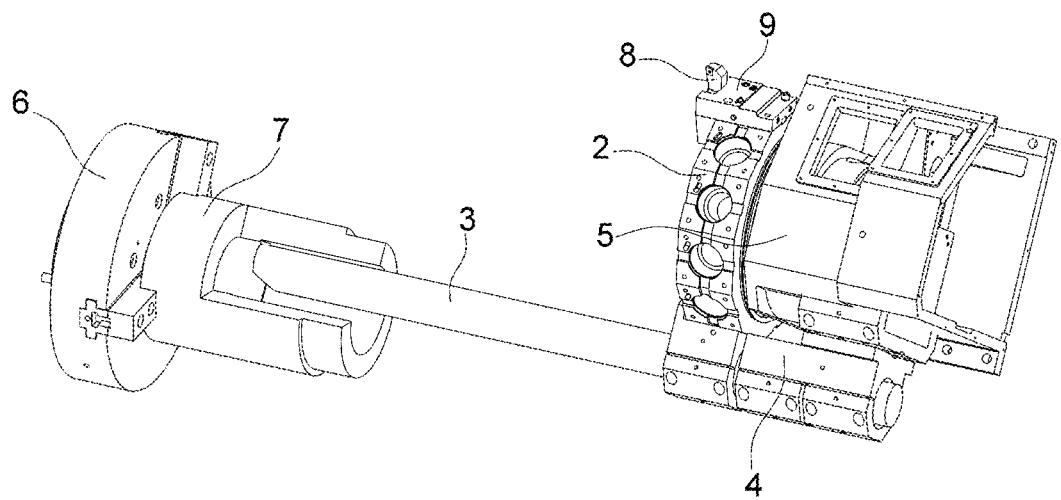
FIG. 1 is a conceptual view of a long boring bar device of a conventional machine tool.
Figure 2:
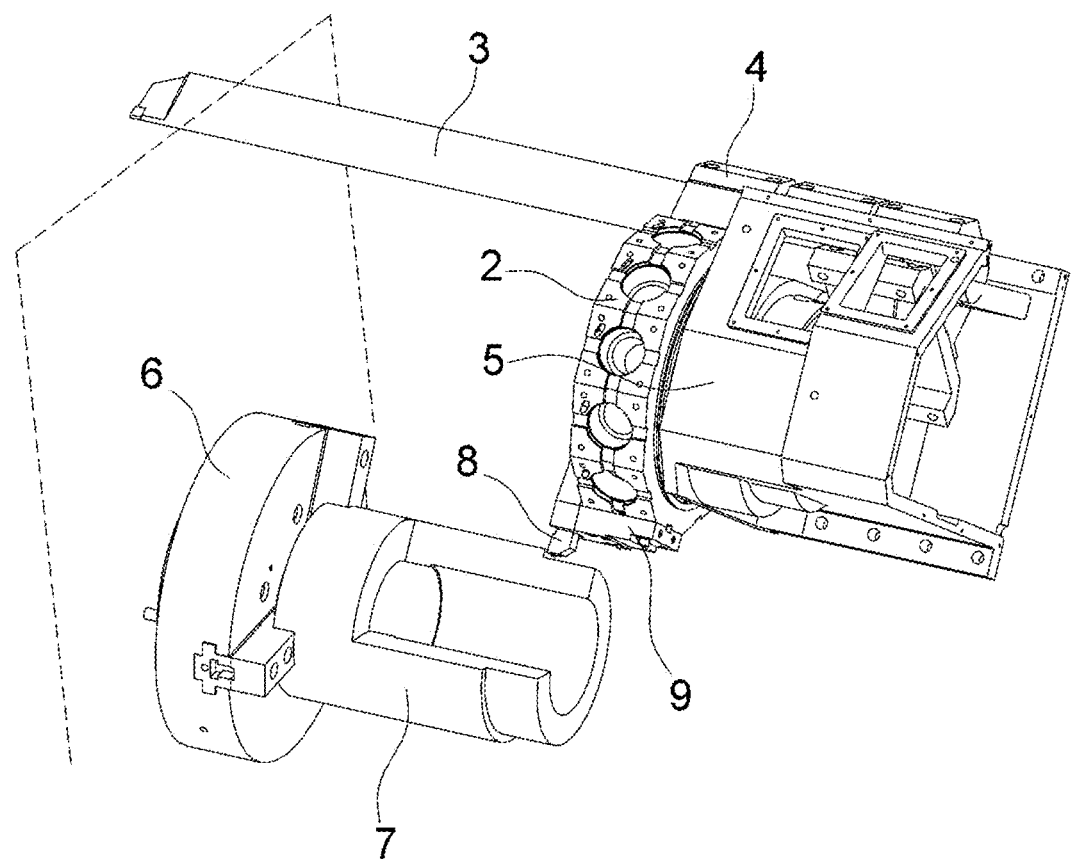
FIG. 2 is a conceptual view of a collision caused by interference in a state in which a long boring bar device is mounted on the related art.

Hereinafter, a long boring bar device of a machine tool according to an embodiment of the present disclosure will be described in detail with reference to the drawings. The following embodiments are provided as an example so that the spirit of the present disclosure can be sufficiently delivered to those skilled in the art. Therefore, the present disclosure is not limited to the embodiments described below, and may be embodied in other forms. In the drawings, the size and thickness of the device may be exaggerated for convenience. Like reference numerals throughout the specification denote like elements.

Advantages and features of the present disclosure and methods of achieving them will become apparent with reference to the embodiments described in detail below together with the accompanying drawings. However, the present disclosure is not limited to the embodiments disclosed below, but will be implemented in various forms different from each other, and only the present embodiments are provided so that the present disclosure is completely disclosed, and the scope of the present disclosure is fully known to those skilled in the art, and the present disclosure is only defined by the scope of the claims. Like reference numerals refer to like elements throughout the specification. The size and relative size of the layers and regions in the drawings may be exaggerated for clarity of description.

The terms used in the present specification are intended to describe the embodiments, and thus the present disclosure is not intended to be limited. In the present specification, the singular form includes the plural form unless specifically mentioned in the phrase. The terms "comprises" and/or "comprising" used in the specification do not preclude the presence or addition of one or more other components, steps, operations and/or elements.

Figure 3:
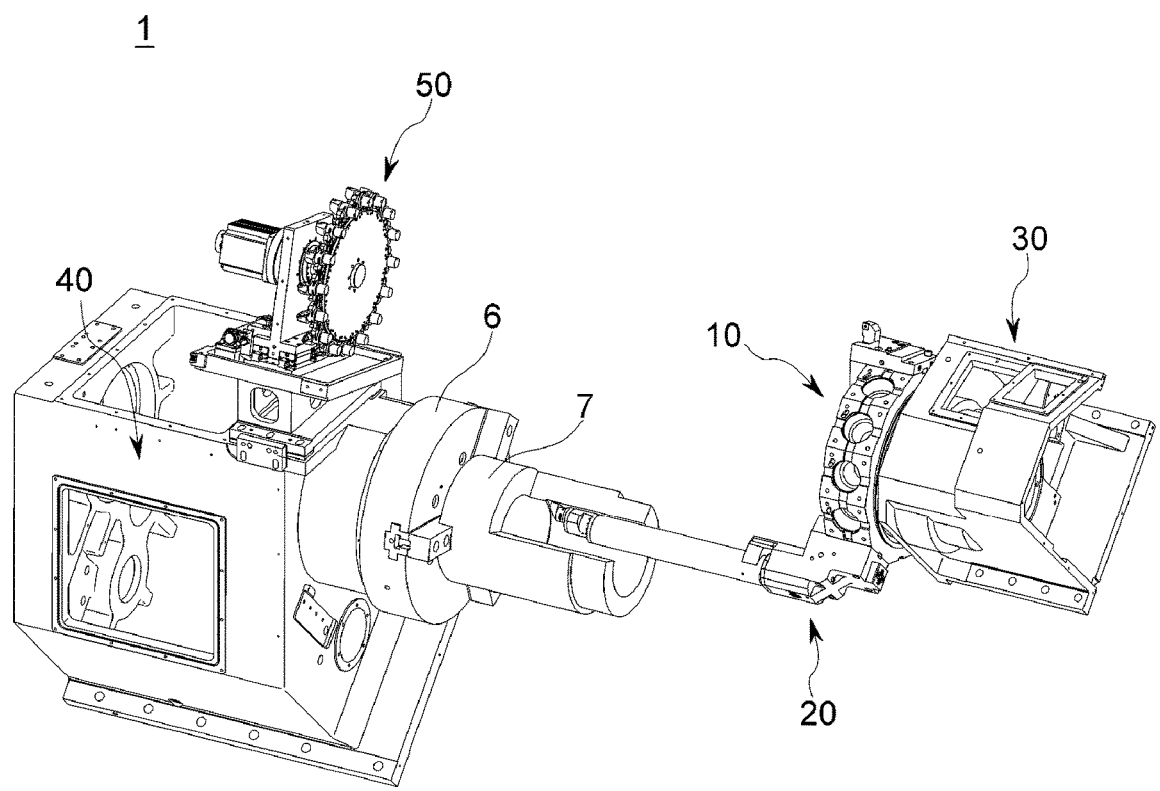
FIG. 3 is a conceptual view of a machine tool in a state in which a long boring bar device according to the present disclosure is mounted.
Figure 4:
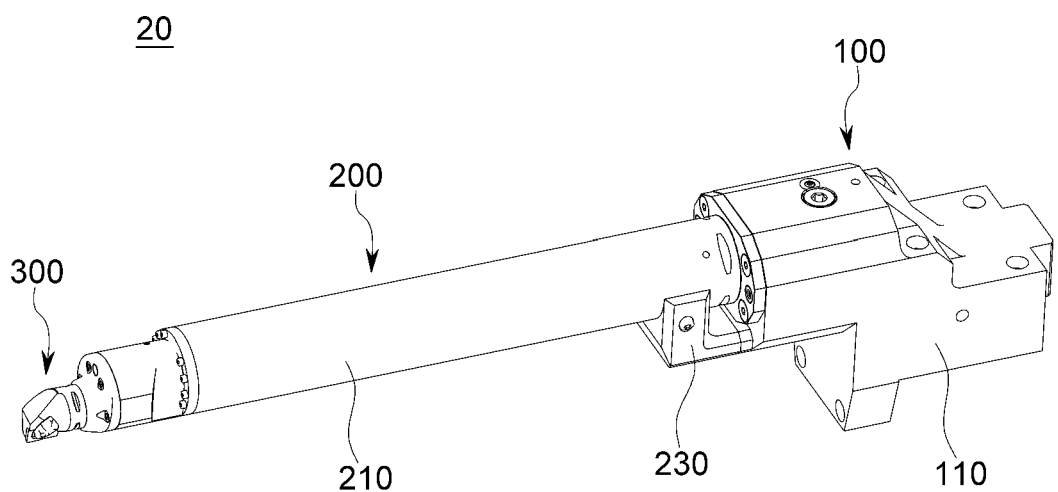
FIG. 4 is a perspective view of a long boring bar device of a machine tool according to the present disclosure.
Figure 5:
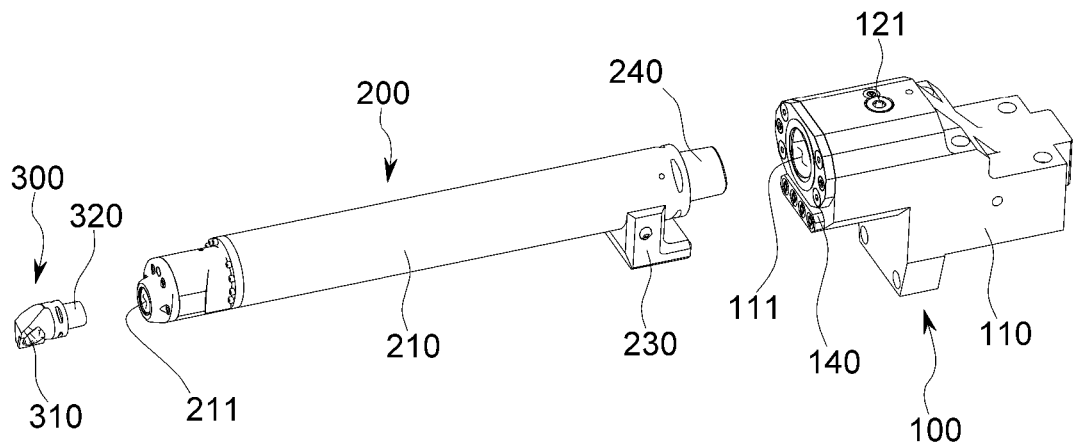
FIG. 5 is an exploded perspective view of the long boring bar device of the machine tool shown in FIG. 4.
Figure 6:
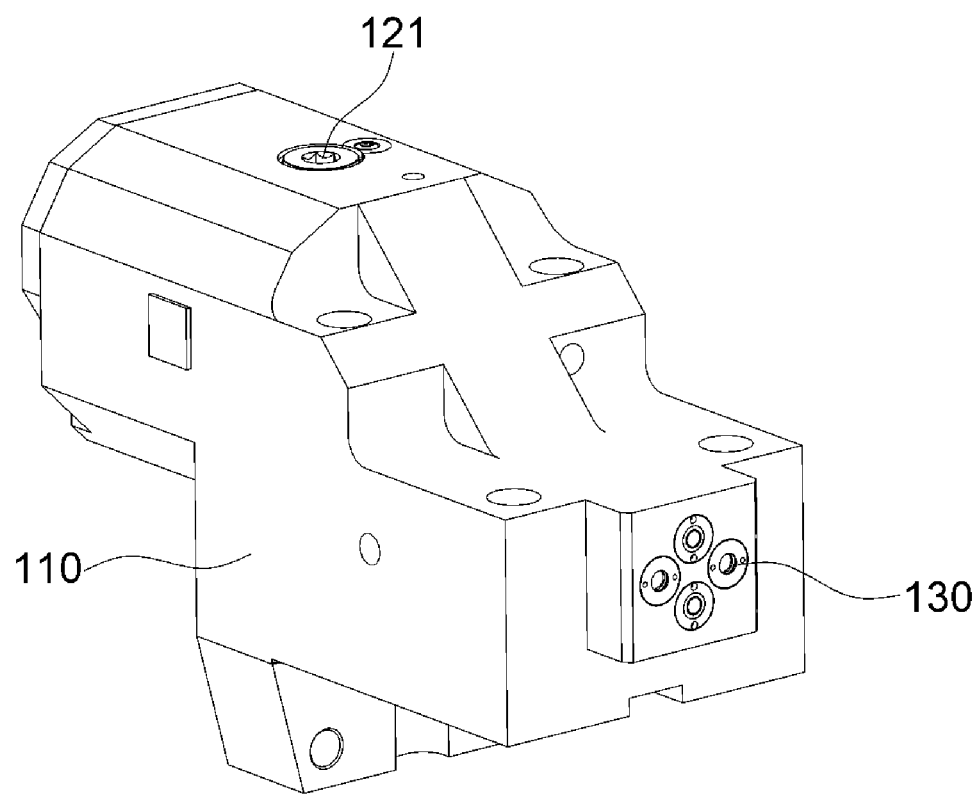
FIG. 6 is a rear perspective view of a holder of a long boring bar device of a machine tool according to the present disclosure.
Figure 7:
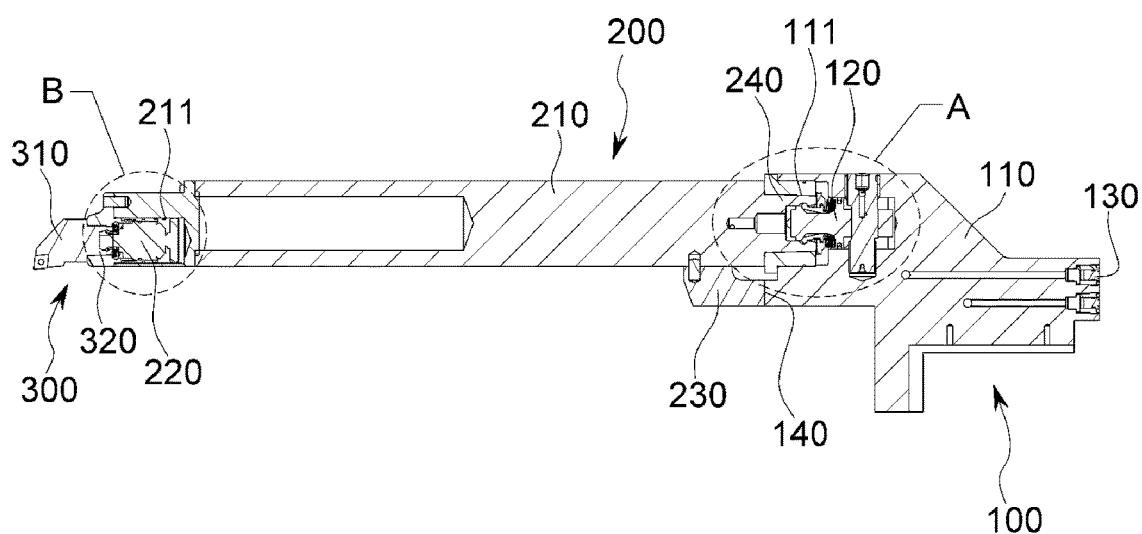
FIG. 7 is a cross-sectional view of a long boring bar device of a machine tool according to the present disclosure.
Figure 8:
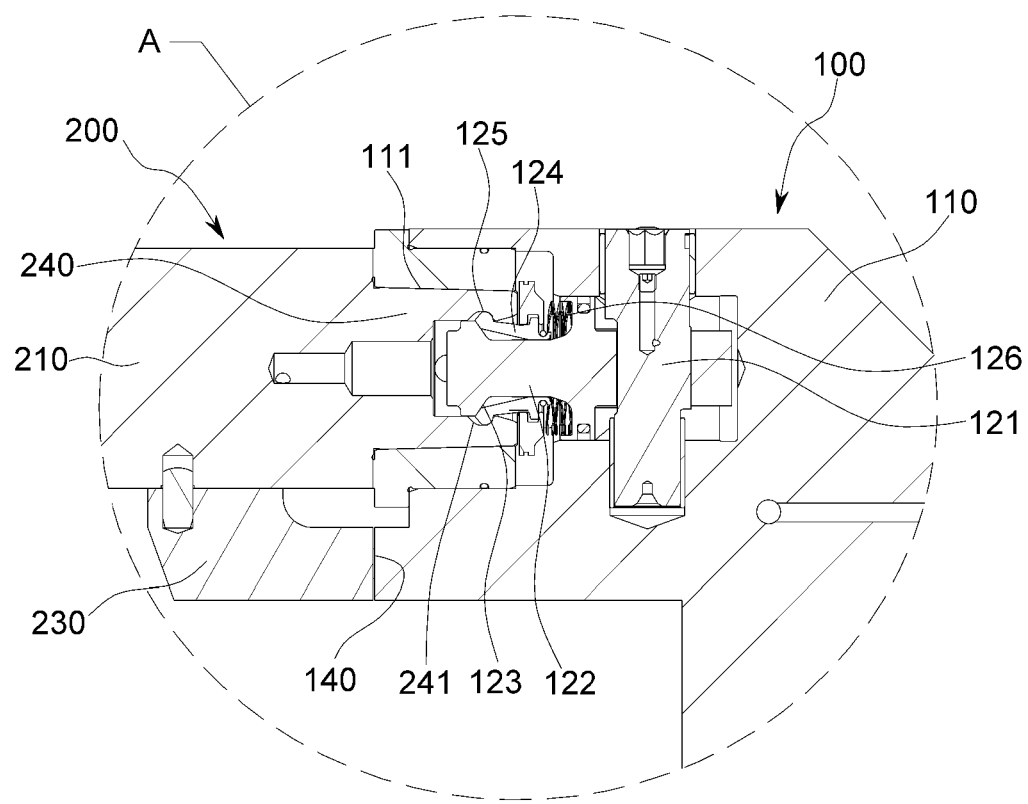
FIG. 8 is an enlarged view of unit A shown in FIG. 7.
Figure 9:
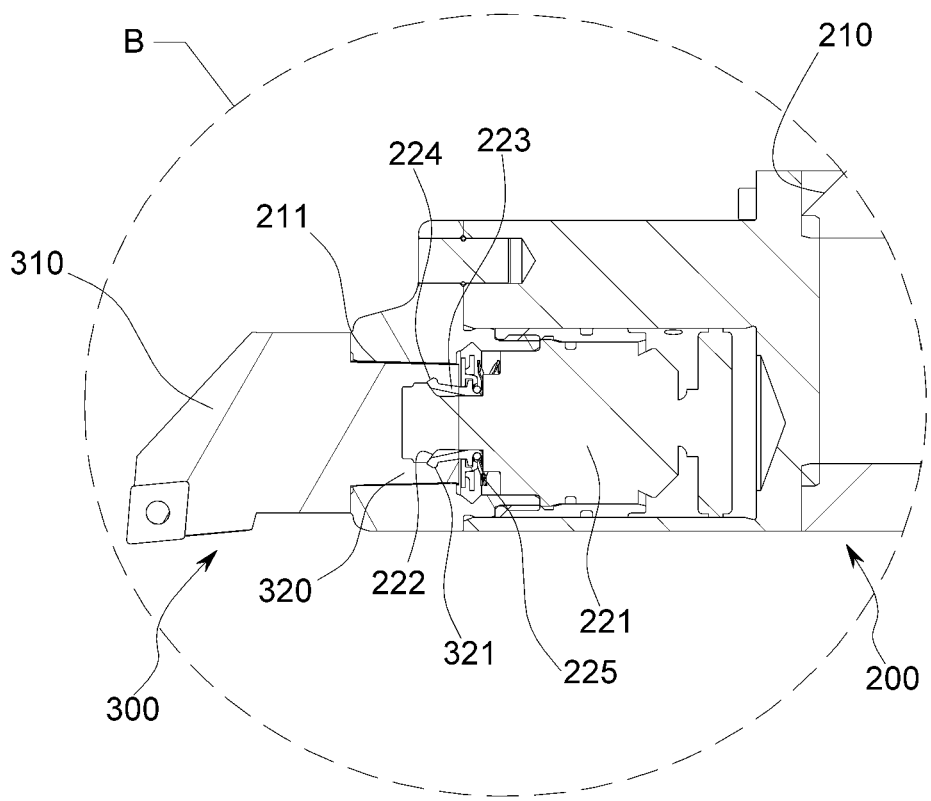
FIG. 9 is an enlarged view of unit B shown in FIG. 7.
Figure 10:
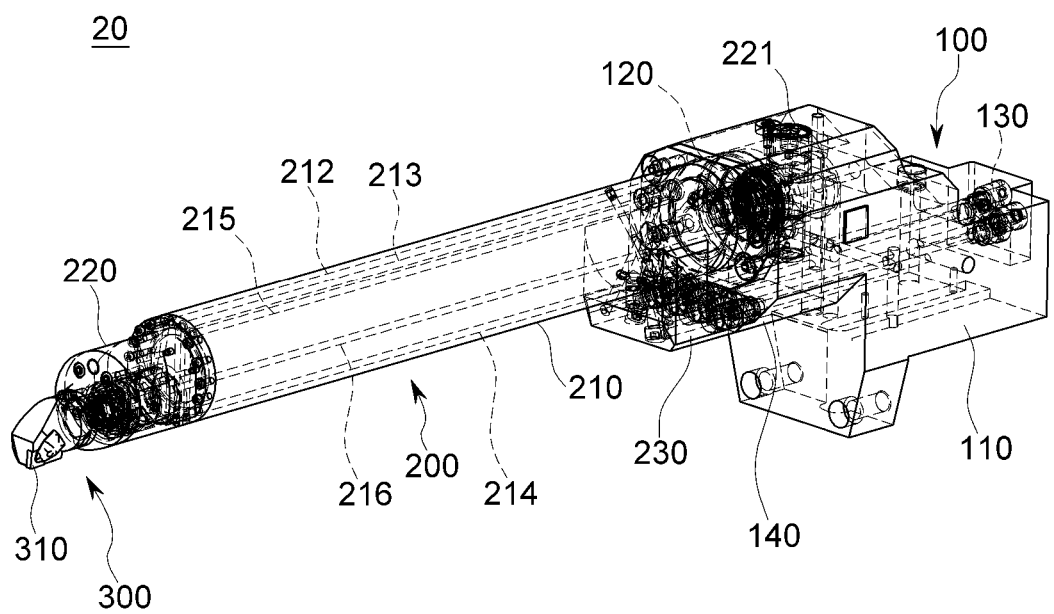
FIG. 10 is a transparent perspective view of a long boring bar device of a machine tool according to the present disclosure.

FIG. 3 is a conceptual view of a machine tool in a state in which a long boring bar device according to the present disclosure is mounted. FIG. 4 is a perspective view of a long boring bar device of a machine tool according to the present disclosure, and FIG. 5 is an exploded perspective view of the long boring bar device of the machine tool shown in FIG. 4. FIG. 6 is a rear perspective view of a holder of a long boring bar device of a machine tool according to the present disclosure. FIG. 7 is a cross-sectional view of a long boring bar device of a machine tool according to the present disclosure, FIG. 8 is an enlarged view of unit A shown in FIG. 7, and FIG. 9 is an enlarged view of unit B shown in FIG. 7. FIG. 10 is a transparent perspective view of a long boring bar device of a machine tool according to the present disclosure.

Hereinafter, the terms used are defined as follows. The term "inside (inner)" means a side relatively close to the center in the same member, that is, an inside of the space in FIGS. 3 to 10, and the term "outside (outer)" means a side relatively far from the center in the same member, that is, an outside of the space in FIGS. 3 to 10. The term "front" means a direction close to the workpiece in the same member, and the term "rear" means a direction far from the workpiece in the same member. The term "one side (one end)" means one end in the longitudinal direction in the same member, and the term "the other side (the other end)" means the opposite unit of "one side (one end)" in the same member, that is, the other end in the longitudinal direction in the same member. That is, "one side (one end)" means the left direction in FIGS. 3 to 10, and "the other side (the other end)" means the right direction in FIGS. 3 to 8.

A long boring bar device of a machine tool according to the present disclosure will be described with reference to FIGS. 3 to 10. As shown in FIGS. 3 to 10, the long boring bar device of a machine tool according to the present disclosure includes a turret 10 and a boring bar unit 20, and the boring bar unit 20 includes a holder 100, a boring bar 200, and a head tool 300.

In addition, a machine tool 1 on which the long boring bar device of the machine tool according to the present disclosure is mounted includes a turret 10, a boring bar unit 20, a tool post 30, a main shaft 40, and a magazine 50.

The turret 10 receives a plurality of tools including the boring bar unit 20. That is, the turret 10 may receive various tools necessary for machining work of the machine tool 1. As shown in FIG. 3, the turret 10 may receive a variety of tools, such as tools used for outer diameter turning and inner diameter turning, as well as tools required for drill or milling operations.

As shown in FIG. 3, the turret 10 is rotatably installed at a unit of the tool post 30 by driving of a driving unit. That is, the turret is provided to be indexable in the tool post. In addition, although not shown in the drawings, the tool post 30 is installed at a part of a body or bed of the machine tool.

Although not shown in FIG. 3, a driving unit of the turret is installed on the tool post 30 and provides rotating power to the turret 10. The driving unit selectively provides the rotating power to the turret 10 to rotate the turret 10 so that the workpiece can be processed by a desired tool among the plurality of tools accommodated in the turret. The driving unit may be formed of a servo motor, but is not limited thereto. In addition, a driving unit is operated by a command of a PLC or a numerical control unit.

In addition, the numerical control unit includes a numerical control (NC) or computerized numerical control (CNC), and various numerical control programs are embedded therein. That is, a driving program of a servo motor which is a driving unit, a driving program of a tool, and the like are embedded in the numerical control unit, and a corresponding program is automatically loaded and operated according to the driving of the numerical control unit. The numerical control unit performs communication with a main operating unit and the PLC by a predetermined protocol.

Further, the main operating unit includes a screen display program and a data input program according to a screen display selection, displays a software switch on a display screen according to an output of a screen display program, and recognizes ON/OFF of a software switch to perform a function of issuing an input/output command of a machine operation.

In addition, although not necessarily limited thereto, the main operating unit is provided in a housing of the machine tool, in the case, or on one side of the housing, so as to be capable of displaying various function switches or buttons, and a monitor capable of displaying various kinds of information.

A programmable logic controller (PLC) performs communication with a numerical control unit or a main control unit according to a predetermined protocol and performs a function of performing a control command through the communication. That is, the PLC operates by receiving a control command according to a numerical control program of a numerical control unit or a main control unit.

The holder 100 of the boring bar unit 20 is detachably fastened to the turret 10. That is, the holder is detachably fastened to one side of the turret so as to support the boring bar. Although not necessarily limited thereto, the holder 100 may be detachably fastened to the turret 10 through a bolt, a rivet, or the like.

The boring bar 200 is fastened to the holder 100 to be clamped or unclamped. That is, a head tool is detachably installed at one end of the boring bar to process an inner diameter or an outer diameter of the workpiece, and the other end of the boring bar is supported by the holder to be detachably installed on the turret. The boring bar may be formed of a hollow cylindrical member having a predetermined length and diameter, but is not limited thereto.

The head tool 300 is fastened to the boring bar 200 in a clamping or unclamping manner. That is, the head tool is detachably installed on one side end of the boring bar, and the other side end of the boring bar is detachably installed on the holder so as to be supported by the turret, and thus the boring bar unit can smoothly perform an operation for expanding the inner diameter of the workpiece or improving the accuracy of the surface of the inner diameter of the workpiece. For example, a machine tool such as a turning center may process an inner diameter or an outer diameter of a middle and large hollow pipe used in a gas pipe or an oil pipe using the boring bar unit 20.

The boring bar unit 20 of the long boring bar device of the machine tool according to the present disclosure is mounted on the turret 10. In detail, as shown in FIG. 3, the boring bar unit 20 may be stored in a magazine 50 installed adjacent to the main shaft 40, and then may be mounted on the turret 10 through the automatic tool changer by a command of the numerical control unit.

That is, as illustrated in FIG. 3, the machine tool 1 includes a main shaft 40 installed on a bed or the ground, which is not illustrated in the drawing, and a chuck 6 connected to the main shaft 40 and connected to the main shaft to be rotated by the rotation of the main shaft. A plurality of jaws is formed on the chuck to support a workpiece 7. Although not shown in the drawings, the main shaft is rotated by a driving device such as a servo motor, and the chuck and the workpiece held by the chuck are rotated by the rotation of the main shaft.

The magazine 50 is installed adjacent to the main shaft. More specifically, the magazine is installed outside the processing area in order to protect a plurality of tools stored from foreign substances such as chips and cutting oil which are emitted when the workpiece is processed. In addition, the magazine may be installed on a part of the main shaft or on the outer side of the machine tool so as to be moved by other driving means such as a ball screw, a linear guide, and a servo motor.

As shown in FIG. 3, the tool post 30 is movably installed in a bed which is not shown by a driving device. Accordingly, the workpiece is processed by moving the workpiece to an optimized moving distance by using a plurality of tools mounted on the turret in order to process the workpiece.

As described above, the boring bar unit 20 may be stored in the magazine 50 in a state in which the holder 100, the boring bar 200, and the head tool 300 are all clamped and coupled to each other, and then may be mounted on the turret 10 through the automatic tool changer by a command of the numerical control unit. In addition, if necessary, the boring bar unit 20 may be stored in the magazine 50 in a state in which only the holder 100 is always mounted on the turret 10 and both the boring bar 200 and the head tool 300 are coupled to each other, and then may be clamped to the holder mounted on the turret 10 through the automatic tool changer by a command of the numerical control unit.

Preferably, when the head tool 300 needs to be replaced, the other head tool 300 stored in the magazine 50 may be easily replaced by automatically clamping or unclamping the holder 100 mounted on the turret 10 and the boring bar 200 clamped by a first clamping unit 120 to the holder through the automatic tool changer by a second clamping unit 220.

As a result, in the long boring bar device of a machine tool according to the present disclosure, the holder 100 is detachably fastened to the turret 10, and not only the holder 100 and the boring bar 200 are detachably fastened to each other, but the head tool 300 is also detachably fastened to the boring bar 200, so that when the head tool 300 needs to be replaced, the head tool 300 may be simply and easily replaced, thereby improving productivity according to a reduction in a non-processing time and maximizing the convenience of a worker.

As shown in FIGS. 4 to 10, a holder 100 of a long boring bar device of a machine tool according to the present disclosure includes a housing unit 110, a first clamping unit 120, an inlet unit 130, and an outlet unit 140.

The housing unit 110 forms an outer shape of the holder 100, and provides a space in which the first clamping unit 120, the inlet unit 130, and the outlet unit 140 are formed. In addition, a first receiving groove 111 into which the other side of the boring bar is inserted is formed at one side of the housing unit 110. That is, when the shank unit 240 of the boring bar to be described later is clamped or unclamped by the first clamping unit to be described later, the housing unit 110 is formed to be recessed into one side of the housing unit, and a first receiving groove into which the shank unit of the boring bar is inserted is formed to support the boring bar. The first receiving groove 111 is formed in a shape corresponding to the shape of the shank unit 240 to receive the shank unit when the boring bar is clamped to the holder and support the boring bar.

The first clamping unit 120 is formed inside the housing unit 110 to be adjacent to the first receiving groove 111 and clamps or unclamps the boring bar 200. That is, the first clamping unit 120 is disposed adjacent to the first receiving groove inside one side of the housing unit to clamp or unclamp the boring bar to the holder through a manual method through the operation of the rotating unit to be described below or an automatic method by hydraulic pressure, although not shown in the drawings. Specifically, the first clamping unit may clamp or unclamp the boring bar to the holder manually or automatically through a manually operated bolt cam structure or an automatically operated hydraulic cylinder.

Accordingly, the long boring bar device of a machine tool according to the present disclosure increases the convenience of a worker, prevents a collision caused by interference between the boring bar and another device when the long boring bar device is not used, thereby preventing the waste of resources due to damage to equipment, reducing the maintenance time and costs of the device, and improving machining precision.

The inlet unit 130 is formed at the other side of the housing unit 110 to supply hydraulic pressure, pneumatic pressure, and cutting oil into the housing unit.

The outlet unit 140 is formed at one side of the housing unit 110 to communicate with the inlet unit 130, and discharges the hydraulic pressure, the pneumatic pressure, and the cutting oil introduced into the housing unit to the outside of the housing unit. That is, the hydraulic pressure, the pneumatic pressure, and the cutting oil discharged through the outlet are transmitted to the first, second, third, fourth, and fifth flow path units formed through the body unit of the boring bar, which will be described later.

In addition, in detail, the inlet unit 130 and the outlet unit 140 are formed to communicate with each other through a plurality of flow paths formed by penetrating the inside of the housing unit. In detail, the inside of the housing unit is provided with a plurality of flow paths formed separately through the inside of the housing unit, and one end of each flow path is connected to the outlet unit and the other end thereof is connected to the inlet unit. Also, each of the flow paths is formed to be able to supply different hydraulic pressures, different pneumatic pressures, and cutting oils through a plurality of holes of the inlet unit and the outlet unit. Also, a fitting unit and a coupling are formed on the inlet unit and the outlet unit so as to prevent the leakage of hydraulic pressure or pneumatic pressure and cutting oil, and stable coupling is carried out during clamping or unclamping so as to improve the stability and reliability of a machine tool and promote cleanliness.

As described above, since the cutting oil supply line supplied when the workpiece is processed is formed in both the holder and the boring bar without a bypass line due to mechanical interference or a non-installable area, the cutting oil supply line supplied when the workpiece is processed as a pneumatic pressure and head tool processing unit for automatically operating a second clamping unit for clamping or unclamping the boring bar and the head tool, which will be described later, is formed in the holder and the boring bar, it is possible to miniaturize the machine tool, maximize space utilization, and reduce manufacturing costs.

As shown in FIGS. 4 to 10, a boring bar 200 of a long boring bar device of a machine tool according to the present disclosure includes a main body 210, a second clamping unit 220, a connection unit 230, and a shank unit 240.

The main body 210 forms an outer shape of the boring bar 200, and provides a space in which the second clamping unit 220, the connection unit 230, and the shank unit 240 are formed. Although not necessarily limited thereto, the hollow cylindrical shape may be formed to have a predetermined length and diameter while penetrating through the inside of the main body 210. In addition, a second receiving groove 211 into which the other side of the head tool is inserted is formed at one side of the main body 210. That is, when the coupling unit 320 of the head tool, which will be described later, is clamped or unclamped by the second clamping unit, which will be described later, the main body 210 is formed by inserting a second receiving groove, into which the coupling unit of the head tool is inserted, into one side of the main body in a longitudinal direction to support the head tool. The second receiving groove 211 is formed in a shape corresponding to the shape of the coupling unit 320 to receive the coupling unit when the head tool is clamped to the boring bar to support the head tool.

The second clamping unit 220 is formed inside the main body 210 to be adjacent to the second receiving groove 211 and clamps or unclamps the head tool 300. That is, the second clamping unit 220 is disposed adjacent to the second receiving groove inside one side of the main body unit to clamp or unclamp the head tool to or from the boring bar through an automatic method using hydraulic pressure supplied through the first flow path unit and the second flow path unit, which will be described later, or a manual method using a bolt piece or the like, which is not illustrated in the drawing. Specifically, the second clamping unit may clamp or unclamp the head tool to or from the boring bar manually or automatically through a bolt cam structure manually operated or a hydraulic cylinder structure automatically operated.

Accordingly, the long boring bar device of a machine tool according to the present disclosure can maximize productivity of the machine tool, increase machining precision, and increase stability and reliability of the machine tool by minimizing non-processing time by automatically exchanging the head tool through an automatic tool changer, etc., when the head tool needs to be replaced.

The connection unit 230 is formed at the other side of the main body unit to communicate with the outlet unit 140 when the boring bar 200 is clamped to the holder 100 and supply the hydraulic pressure, the pneumatic pressure, and the cutting oil discharged from the outlet unit into the main body 210. That is, the connection unit 230 is connected to the first, second, third, fourth, and fifth flow path units to be described below, and is engaged with the outlet unit through a fitting unit or a coupling when clamped in the holder to transfer hydraulic or pneumatic or cutting oil discharged from the outlet unit to the first, second, third, fourth, and fifth flow path units.

The shank unit 240 is formed at the other side of the main body 210 and is coupled to the first clamping unit when the boring bar 200 is clamped to the holder 100. In detail, the shank unit 240 is formed in a shape corresponding to the first receiving groove 111 so as to be inserted into the first receiving groove 111 or withdrawn from the first receiving groove, and is coupled to or decoupled from the first clamping unit by the operation of the first clamping unit.

In addition, the shank unit 240 includes a first seating groove 241 recessed in the other inner circumferential surface of the shank unit. That is, the first seating groove 241 is recessed in the circumferential direction along the inner circumferential surface of the other side of the shank unit.

As shown in FIGS. 4 to 10, the head tool 300 of the long boring bar device of the machine tool according to the present disclosure includes a processing unit 310 and a coupling unit 320.

The processing unit 310 processes an inner diameter or an outer diameter of the workpiece. A tip for processing the workpiece may be formed at a front end or one side of the processing unit 310. In addition, the processing unit 310 may be formed in various shapes according to the type of a workpiece to be processed and the size of the workpiece.

The coupling unit 320 is formed at the other side of the processing unit 310 and is coupled to the second clamping unit 220 when the head tool 300 is clamped to the boring bar 200. In detail, the coupling unit 320 is formed in a shape corresponding to the second receiving groove 211 so as to be inserted into the second receiving groove 211 or withdrawn from the second receiving groove, and is coupled to or decoupled from the second clamping unit by the operation of the second clamping unit.

In addition, the coupling unit 320 includes a second seating groove 321 recessed in the other inner circumferential surface of the coupling unit. That is, the second seating groove 321 is recessed in the circumferential direction along the inner circumferential surface of the other side of the coupling unit.

As shown in FIGS. 7 to 10, the first clamping unit 120 of the holder 100 of the long boring bar device of a machine tool according to the present disclosure includes a rotating unit 121, a first cylinder 122, a first locking unit 124, and a first elastic unit 126.

The rotating unit 121 is rotatably inserted into the housing unit 110. That is, the rotating unit 121 is rotatably inserted into the housing unit to be adjacent to the first receiving groove and perpendicular to the longitudinal direction of the first receiving groove.

The first cylinder 122 is formed to move forward or backward with respect to the shank unit according to a rotating direction of the rotating unit 121. That is, for example, the first cylinder 122 moves forward toward the shank unit to clamp the boring bar when the rotating unit is rotated in the clockwise direction in the housing unit 110, and moves backward toward the shank unit to unclamp the boring bar when the rotating unit is rotated in the counterclockwise direction. In addition, the first cylinder 122 includes a first inclined surface 123 formed to be tapered along a flange surface formed to protrude from a front end of one side adjacent to the first receiving groove of the first cylinder.

The first locking unit 124 is pivotably installed along a first inclined surface formed at one side of the first cylinder.

The first elastic unit 126 is installed between the first locking unit and the other end of the first cylinder unit to provide elastic force to the first cylinder when the first cylinder is moved backward. As described above, since the first elastic unit provides elastic force when the first cylinder is moved backward by the restoring force, the convenience of a worker may be promoted, and the device may be miniaturized and compact. The first elastic unit 126 may be formed of a compression spring, but is not limited thereto.

Referring to FIGS. 7 and 8, the clamping or unclamping operation principle of the boring bar and the holder will be described.

As the first cylinder moves forward with respect to the shank unit by the rotation of the rotating unit, the boring bar and the holder are clamped as a first hook unit formed at a front end of one side of the first locking unit rotates along a first inclined surface and engages with the first seating groove. On the other hand, as the first cylinder moves backward against the shank unit by the opposite rotation of the rotating unit, the boring bar and the holder are unclamped as the first holding unit formed at the front end of one side of the first locking unit rotates along the first inclined surface and is released from the first receiving groove.

In detail, when a worker or a control signal rotates a rotation unit in a clockwise or counterclockwise direction when clamping a boring bar and a holder, the first cylinder unit moves forward toward the shank unit, and as the first cylinder unit moves forward (moves in a direction adjacent to a first receiving groove) toward the shank unit, the first locking unit rotates to ascend along a first inclined surface, and accordingly, the first holding unit is snap-coupled to a first seating groove to be engaged therewith, thereby clamping the boring bar on the holder. On the contrary, when the rotating unit is rotated in the opposite way to that when the boring bar and the holder are clamped by an operator or a control signal during the unclamping, the first cylinder unit moves backward with respect to the shank unit (moves in a direction away from the first receiving groove), and as the first cylinder unit moves backward with respect to the shank unit, the first locking unit rotates to descend along the first inclined surface, and accordingly, the first catching unit is released from the first receiving groove and is separated, thereby unclamping the boring bar from the holder.

As described above, in the long boring bar device of a machine tool according to the present disclosure, the boring bar can be mounted on or detached from the holder by the simple rotation operation of the rotating unit of the first clamping unit, thereby increasing the convenience of a worker, and when the long boring bar is not used, the long boring bar and other devices can be prevented from colliding with each other, thereby reducing maintenance time and costs due to damage to the equipment, preventing the waste of resources, and reducing processing costs.

As shown in FIG. 10, the main body 210 of the boring bar 200 of the long boring bar device of a machine tool according to the present disclosure includes a first flow path unit 212, a second flow path unit 213, a third flow path unit 214, a fourth flow path unit 215, and/or a fifth flow path unit 216.

The first flow path unit 212 is connected to the connection unit and is formed to pass through the inside of the main body unit. That is, one end of the first flow path unit communicates with the second clamping unit, and the other end thereof is formed to penetrate through the inside of the main body unit to communicate with the connection unit, so that the hydraulic pressure introduced into the connection unit is transmitted to the second clamping unit, thereby providing power for moving the second cylinder to be described below forward.

The second flow path unit 213 is formed to communicate with the connection unit and to pass through the inside of the main body unit. That is, one end of the first flow path unit communicates with the second clamping unit, and the other end thereof is formed to penetrate through the inside of the main body unit to communicate with the connection unit, so that the hydraulic pressure introduced into the connection unit is transmitted to the second clamping unit, thereby providing power for moving the second cylinder in a backward direction.

As described above, in the long boring bar device of a machine tool according to the present disclosure, the head tool is automatically and detachably fastened to the boring bar through the first flow path unit formed inside the body unit of the boring bar and the second clamping unit operated by the hydraulic pressure supplied through the second flow path unit, so that when the head tool needs to be replaced, the head tool is automatically exchanged through the automatic tool changer or the like through the signal of the numerical control unit, thereby minimizing the non-processing time to maximize productivity of the machine tool and increasing the machining precision.

The third flow path unit 214 is formed to communicate with the connection unit and to pass through the inside of the main body unit. That is, one end of the third flow path unit is connected to the second receiving groove and the other end is formed to pass through the inside of the main body unit to be connected to the connection unit, and the pneumatic pressure introduced into the connection unit is transmitted to the second receiving groove, thereby checking whether the head tool and the boring bar are normally clamped. An air gap sensor or the like is installed to be adjacent to one end of the third flow path unit to check whether the head tool is normally clamped to the boring bar when the head tool is automatically replaced according to whether pneumatic pressure supplied through the third flow path unit is leaked, thereby preventing malfunction and maximizing reliability and safety of the machine tool.

The fourth flow path unit 215 is formed to communicate with the connection unit and to pass through the inside of the main body unit. That is, one end of the fourth flow path unit is communicated with one end of the second clamping unit and the second receiving groove, and the other end is communicated with the main body unit by penetrating the inside of the main body unit, thereby cleaning the second clamping unit and the second receiving groove when the head tool is replaced by the pneumatic pressure introduced into the connection unit. As described above, when the head tool is automatically replaced through the automatic tool changer by automatically moving the second clamping unit forward or backward by the hydraulic pressure supplied through the first flow path unit and the second flow path unit through the signal of the numerical control unit, the second clamping unit and the second receiving groove are cleaned by the pneumatic pressure supplied through the fourth flow path unit, and thus foreign substances are removed from the second clamping unit and the second receiving groove, thereby maintaining the stable clamping state of the boring bar and the head tool, improving the machining precision, preventing malfunction, improving the safety and reliability of the machine tool, and improving the convenience of the worker.

The fifth flow path unit 216 is connected to the connection unit and is formed to pass through the inside of the main body unit. That is, one end of the fifth flow path is connected to the processing unit and the other end is connected to the connection unit by penetrating the inside of the main body, thereby rapidly and smoothly supplying the cutting oil introduced into the connection unit when the workpiece is processed by the processing unit. In detail, when the boring bar is clamped with the holder, cutting oil, which flows into the housing unit of the holder through the inlet unit and is discharged to the outside of the housing unit through the outlet unit, is supplied to the front end of the head tool through the connection unit and the fifth flow path unit. Accordingly, it is possible to increase the life of the head tool by minimizing damage to the tool due to frictional heat, to improve machining precision, and to reduce the size of the long boring bar device by removing unnecessary lines, thereby reducing the manufacturing cost and the manufacturing time of the entire machine tool and maximizing the space utilization.

As shown in FIGS. 7 to 10, the second clamping unit 220 of the boring bar 200 of the long boring bar device of a machine tool according to the present disclosure includes a second cylinder 221, a second locking unit 223, and a second elastic unit 225.

The second cylinder 221 is formed to move forward or backward with respect to the coupling unit by hydraulic pressure introduced through the first flow path unit or the second flow path unit. In addition, the second cylinder 221 includes a first hydraulic pressure inflow groove and a second hydraulic pressure inflow groove. That is, for example, when the hydraulic pressure of the first hydraulic pressure inflow groove is increased by the hydraulic pressure introduced through the first flow path unit 212, the second cylinder moves forward toward the coupling unit (moves in a direction adjacent to the second accommodation groove) to clamp the head tool, and when the hydraulic pressure of the second hydraulic pressure inflow groove is increased by the hydraulic pressure introduced through the second flow path unit 213, the second cylinder moves backward toward the coupling unit (moves in a direction away from the second accommodation recess) to unclamp the head tool. In addition, the second cylinder 221 includes a second inclined surface 222 formed to be tapered along a flange surface formed to protrude from a front end of one side adjacent to the second receiving groove of the second cylinder.

The second locking unit 223 is pivotably installed along a second inclined surface formed at one side of the second cylinder.

The second elastic unit 225 is installed between the second locking unit and the other end of the second cylinder unit to provide elastic force to the second cylinder when the second cylinder is moved backward. As described above, since the second elastic unit provides elastic force when the second cylinder is moved backward by the restoring force, the convenience of the worker may be promoted, and the device may be miniaturized and compact. The second elastic unit 225 may be formed of a compression spring, but is not limited thereto.

Referring to FIGS. 7 and 9 to 10, the clamping or unclamping operation principle of the head tool and the boring bar will be described.

As the second cylinder moves forward (moves in the direction adjacent to the second receiving groove) by the hydraulic pressure introduced through the first flow path unit, the head tool and the boring bar enable a second locking unit formed at the front end of one side of the second locking unit to rotate along the second inclined surface and to be engaged and clamped in the second receiving groove. On the contrary, the head tool and the boring bar are unclamped by rotating the second locking unit along the second inclined surface and being released from the second seating groove as the second cylinder is moved backward by the hydraulic pressure introduced through the second flow path unit.

In detail, when the head tool and the boring bar are clamped, if hydraulic pressure that has passed through the first flow path unit via the inlet unit, the outlet unit, and the connection unit from a hydraulic pressure supply source is supplied to the first hydraulic pressure inflow groove through a control signal of the numerical control unit, and thus the hydraulic pressure in the first hydraulic pressure inflow groove increases, the second cylinder unit moves forward toward the coupling unit, and as the second cylinder unit moves forward toward the coupling unit (moves in a direction adjacent to the second receiving groove), the second locking unit turns so as to move up along the second inclined surface, and accordingly, the second catching unit is snap-coupled to the second receiving groove so as to be engaged, whereby the head tool is automatically clamped at the boring bar. On the contrary, when the head tool and the boring bar are unclamped, if the hydraulic pressure passing through the first flow path unit via the inlet, the outlet, and the connection unit from the hydraulic pressure supply source is supplied to the second hydraulic inflow groove through the control signal of the numerical control unit to increase the inflow of the second hydraulic pressure groove, the second cylinder unit moves backward with respect to the coupling unit (moves in a direction away from the second receiving groove), and as the second cylinder unit moves backward with respect to the coupling unit, the second locking unit rotates to descend along the second inclined surface, and accordingly, the second locking unit is released from the second receiving groove and is separated, and thus the head tool is unclamped from the boring bar.

As described above, in the long boring bar device of a machine tool according to the present disclosure, the head tool is automatically and detachably fastened to the boring bar by the first flow path unit formed inside the boring bar and the second clamping unit operated by the hydraulic pressure supplied through the second flow path unit, so that when the head tool needs to be replaced, the head tool is automatically exchanged through an automatic tool changer or the like to minimize the non-processing time, thereby maximizing productivity of the machine tool and increasing the machining precision.

Although the detailed description of the present disclosure has been described with reference to the exemplary embodiments of the present disclosure, those skilled in the art or those skilled in the art will understand that the present disclosure can be variously modified and changed without departing from the spirit and technical scope of the present disclosure described in the claims to be described below. Therefore, the technical scope of the present disclosure is not limited to the contents described in the detailed description of the specification, but should be determined by the claims.

DESCRIPTION OF MAIN REFERENCE NUMERALS OF DRAWINGS

1: machine tool
10: turret
20: boring bar unit
30: tool post
40: main shaft
50: magazine
100: holder
110: housing
120: first clamping unit
130: inlet unit
140: outlet unit
200: boring bar
210: main body unit
220: second clamping unit
230: connection unit
240: shank unit
300: head tool
310: processing unit
320: coupling unit.

The invention claimed is:
1. A boring bar device of a machine tool, the boring bar device comprising:
  a turret configured to accommodate a plurality of tools; and
  a boring bar unit mounted on the turret,
  wherein the boring bar unit comprises:
    a holder detachably fastened to the turret;
    a head tool fastened to the boring bar; and
    a boring bar fastened to the holder, wherein the boring bar is capable of being clamped to or unclamped from the holder, wherein the head tool is capable of being clamped to or unclamped from the boring bar, wherein the boring bar is between the holder and the head tool such that the holder and head tool are fastened to opposite ends of the boring bar,
  wherein the holder comprises:
    a housing unit having a first receiving hole formed in a first side surface thereof;

a first clamping unit formed inside the housing unit, wherein the first clamping unit extends into the first receiving hole such that the first clamping unit clamps or unclamps the boring bar;

an inlet unit formed in a second side surface, opposite the first side surface, of the housing unit and supplying hydraulic pressure and pneumatic pressure into the housing unit; and an outlet unit formed in the first side surface of the housing unit, wherein the outlet unit is configured to communicate with the inlet unit, wherein the first clamping unit comprises:
  a rotating unit rotatably inserted into a bore of the housing unit;
  a first cylinder moving in a direction transverse to a rotation axis of the rotating unit, forward or backward, according to a rotating direction of the rotating unit; and
  a first locking unit pivotably installed along a first inclined surface formed at one side of the first cylinder, wherein the boring bar comprises:
  a main body unit extending between opposing first and second ends;
  a shank unit formed at the first end of the main body unit, wherein the shank unit is coupled to the first clamping unit;
  a connection unit attached directly to each of the first side surface of the housing unit and a circumferential surface of the main body unit, wherein the connection unit is configured to communicate with the outlet unit to supply hydraulic pressure and pneumatic pressure discharged from the outlet unit to channels inside of the main body unit;
  a second receiving hole formed in the second end of the main body unit; and
  a second clamping unit formed in the main body unit, wherein the second clamping unit is in the second receiving hole such that the second clamping unit clamps or unclamps the head tool, wherein the channels within the main body comprise
  a first flow path unit communicating with the connection unit and penetrating through the inside of the main body; and
  a second flow path unit communicating with the connection unit and penetrating through the inside of the main body, and wherein the second clamping unit comprises:
  a second cylinder configured to move in the direction transverse to the rotation axis of the rotating unit, forward or backward, by hydraulic pressure introduced through the first flow path unit or the second flow path unit; and
  a second locking unit pivotably installed along a second inclined surface formed at one side of the second cylinder, wherein movement of the second cylinder actuates the second locking unit to clamp and unclamp the head tool from the boring bar.

2. The boring bar device of claim 1, wherein the head tool comprises:
  a tool bit configured to process an inner diameter or an outer diameter of the workpiece; and
  a coupling unit formed at one side of the head tool and coupled to the second clamping unit.

3. The boring bar device of claim 1,
wherein the shank unit comprises a first seating groove recessed into an inner circumferential surface of a receiving bore of the shank unit, and
the boring bar and the holder are clamped via the first locking unit being rotated along the first inclined surface until engaged with the first seating groove.

4. The boring bar device of claim 2, wherein the coupling unit comprises a second seating groove recessed into an inner circumferential surface of the coupling unit.

5. The boring bar device of claim 3,
wherein the head tool comprises:
  a coupling unit formed at one side of the head tool and coupled to the second clamping unit,
  wherein the coupling unit comprises a second seating groove recessed into an inner circumferential surface of the coupling unit; and
wherein the head tool and the boring bar are clamped via the second locking unit being rotated along the second inclined surface until engaged with the second seating groove.

6. The boring bar device of claim 1, wherein the channels within the main body comprise:
  a third flow path unit communicating with the connection unit and penetrating through the inside of the main body, and the third flow path delivering pneumatic pressure to an air gap sensor installed adjacent one end of the third flow path for checking the pneumatic pressure in the third flow path.

7. The boring bar device of claim 1, wherein the channels within the main body comprise:
  a third flow path unit communicating with the connection unit and penetrating through the inside of the main body to supply pneumatic pressure for cleaning the second clamping unit and the second receiving hole groove.

8. The boring bar device of claim 1, the channels within the main body comprise:
  a third flow path unit communicating with the connection unit and penetrating through the main body unit to supply cutting oil supplied into the housing unit through the inlet unit and discharged through the outlet unit to the head tool.

* * * * *